US007879424B2

(12) United States Patent
Smith et al.

(10) Patent No.: US 7,879,424 B2
(45) Date of Patent: Feb. 1, 2011

(54) METHOD FOR MAKING A VEHICLE PANEL

(75) Inventors: Nels R. Smith, Zeeland, MI (US); James D. Schichtel, Grand Haven, MI (US); Chad M. Baumann, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 594 days.

(21) Appl. No.: 10/576,833

(22) PCT Filed: Oct. 27, 2003

(86) PCT No.: PCT/US03/33859

§ 371 (c)(1),
(2), (4) Date: Apr. 24, 2006

(87) PCT Pub. No.: WO2005/051722

PCT Pub. Date: Jun. 9, 2005

(65) Prior Publication Data

US 2007/0035071 A1 Feb. 15, 2007

(51) Int. Cl.
*B32B 3/00* (2006.01)
*B60J 5/04* (2006.01)

(52) U.S. Cl. ........................ 428/71; 428/76; 428/319.3; 428/319.7; 428/319.9; 428/314.4; 428/156; 428/161; 428/191; 296/146.7; 296/153; 296/39.1; 296/1.08

(58) Field of Classification Search ............. 296/146.7, 296/153, 39.1, 1.08; 428/319.3, 319.7, 319.9, 428/314.4, 156, 161, 192, 71, 76
See application file for complete search history.

(56) References Cited

U.S. PATENT DOCUMENTS

| | | | | |
|---|---|---|---|---|
| 4,445,954 | A | 5/1984 | Adms et al. | |
| 4,741,945 | A | 5/1988 | Brant et al. | |
| 5,387,390 | A | 2/1995 | Kornylo | |
| 5,397,409 | A | 3/1995 | Kornylo | |
| 6,248,200 | B1 | 6/2001 | Dailey et al. | |
| 2002/0017360 | A1* | 2/2002 | Hiraiwa et al. | 156/228 |
| 2002/0125734 | A1* | 9/2002 | Pokorzynski et al. | 296/146.7 |
| 2003/0057583 | A1 | 3/2003 | Whitehead et al. | |
| 2007/0029829 | A1* | 2/2007 | Johnson et al. | 296/1.08 |
| 2009/0295011 | A1* | 12/2009 | Smith et al. | 264/101 |

FOREIGN PATENT DOCUMENTS

DE 101 40 873 A1 3/2003

OTHER PUBLICATIONS

International Search Report for PCT/US 03/33859, date of mailing Jun. 5, 2004, 3 pages.

* cited by examiner

*Primary Examiner*—Hai Vo
(74) *Attorney, Agent, or Firm*—Foley & Lardner LLP

(57) ABSTRACT

A method of forming a panel is disclosed. The method includes forming a flexible skin (22); coupling a compressible material (24) to the skin (22); positioning the skin (22) and compressible material (24) in a mold; and forming a rigid substrate (20) around the skin (22) and compressible material (24) providing a first soft region (12) wherein the compressible material (24) is disposed between the skin (22) and the substrate (20) so that a first soft region (12) is defined by the compressible material (24).

9 Claims, 4 Drawing Sheets

METHOD FOR MAKING A VEHICLE PANEL

CROSS-REFERENCE TO RELATED APPLICATIONS

The present invention claims priority as a national stage application of International Patent Application Serial No. PCT/US2003/033859 filed on Oct. 27, 2003, which is hereby incorporated herein by reference in its entirety.

FIELD

The present invention relates to a vehicle trim panel. More specifically, the present invention relates to a vehicle trim panel, such as for a door, with an integrated soft armrest.

BACKGROUND

The present inventions relate generally to the field of components such as panels or other structures for use in vehicles (e.g., automobiles such as cars, trucks, and the like; airplanes, boats, etc.). More specifically, the present inventions relate to interior panels or structures for vehicles or other applications that include at least one relatively soft (e.g., padded or cushioned) portion.

Padded or cushioned vehicle interior components such as panels (e.g., instrument panels, door panels, etc.) conventionally include a substrate made of a relatively rigid material, a relatively soft core (e.g., a foam core), and an outer surface or skin. For example, a vehicle door panel may be cushioned to provide added comfort for an occupant of a vehicle when a portion of the occupant's body interfaces or contacts the door panel. Various methods of providing such cushioning are known in the art, although such known methods do not provide certain advantageous features and/or combination of features.

For example, one difficulty in producing panels having cushioned portions is that it may be difficult to optimize the location of the cushioned portions such that the cushioned portions are provided only in areas that are directly interfaced (e.g., contacted) by an individual. For example, certain areas of vehicle interior trim panels are not contacted by passengers such as locations on a door panel proximate the floor of the vehicle. There may be little or no reason to provide cushioned portions of the door panel in such regions. Further, providing cushioned portions or regions in areas where there is no requirement to do so adds unnecessary expense (i.e., material, labor, and equipment) and may also add excess weight to the vehicle.

To provide localized cushioned portions for interior vehicle components, one known method involves coupling a cushioned component to a rigid component. For example, a relatively rigid panel (e.g., a door panel) may have coupled thereto a component that includes a relatively rigid substrate, a relatively soft skin, and a foam interior portion. One difficulty with such a method is that such method requires the use of additional components (e.g., an additional substrate, bolts or other fastening devices to secure the panel substrate to the substrate of the cushioned portion, etc.), which adds both weight and expense to the finished product.

Accordingly, there is a need to provide a method for producing components such as panels or other structures for use in vehicles that includes a relatively soft portion or section. There is also a need to provide components that have regions of localized cushioning that are optimized based on the location likely to be interfaced by a vehicle occupant or other individual. There is also a need to provide a component that has regions of localized cushioning that has a decreased mass and requires less material than conventional components having cushioned regions. There is also a need to provide an integrally formed vehicle component that includes localized regions of cushioning. There is also a need to provide components and a method for making components that may be manufactured in a relatively simple and efficient manner with reduced manufacturing and material costs. There is also a need to provide a manufacturing method for producing components having one or more cushioned portions that utilizes existing equipment.

SUMMARY

The present invention relates to a method of forming a panel. The method comprises forming a flexible skin; coupling a compressible material to the skin; positioning the skin and compressible material in a mold; and forming a rigid substrate around the skin and compressible material providing a first soft region wherein the compressible material is disposed between the skin and the substrate so that a first soft region is defined by the compressible material. The substrate may comprises a molded polymer material such as a thermoplastic. The skin may comprise a thermoplastic olefin and be formed by vacuum forming and trimming a sheet. The compressible material may comprise a foam material such as a closed cell foam. The may comprise flanges so that the substrate can be molded to at least partially encapsulate the flanges. A second soft region may be defined by a portion of the skin in direct contact with the substrate (e.g., the compressible material is not disposed between the skin and the substrate).

The present invention further relates to various features and combinations of features shown and described in the disclosed embodiments.

Figure 1:
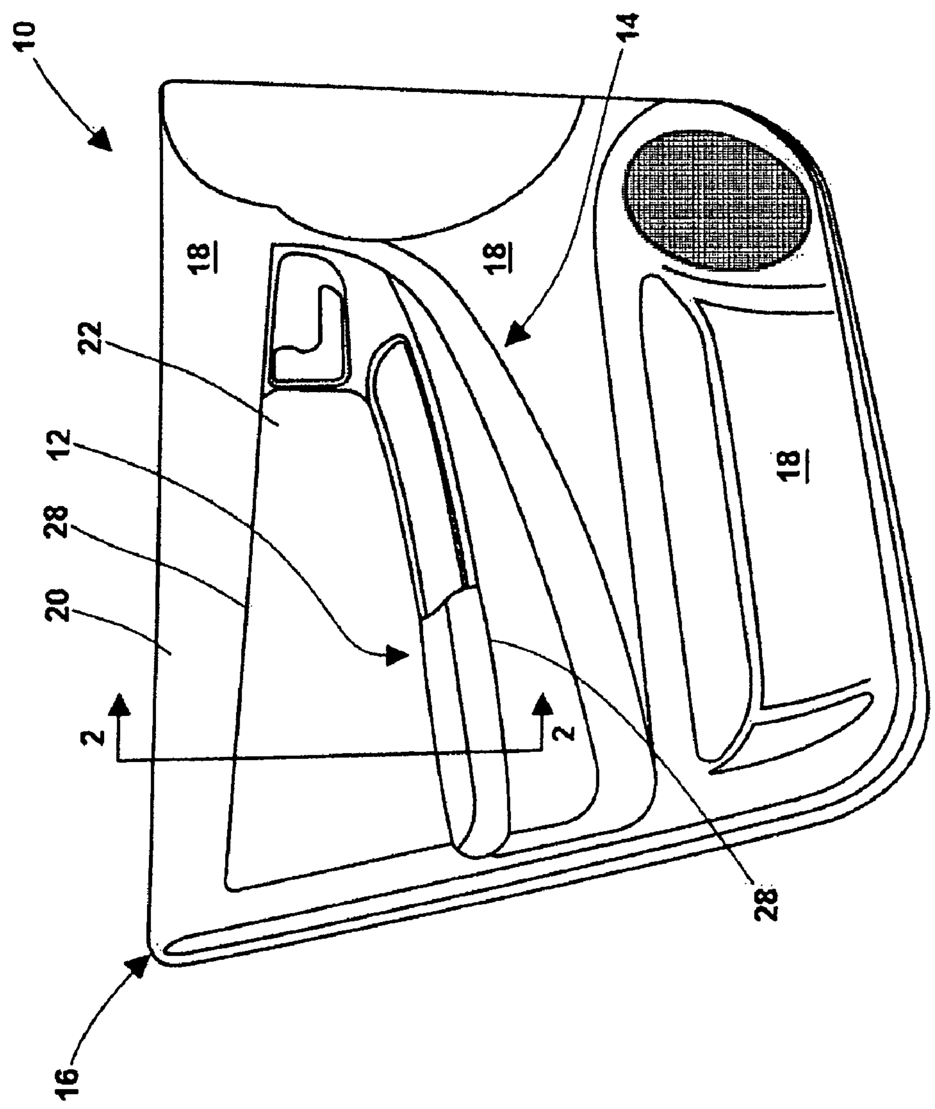
FIG. 1 is a perspective view of a door trim panel according to a preferred embodiment.

Before explaining a number preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF PREFERRED AND OTHER EXEMPLARY EMBODIMENTS

Figure 2:
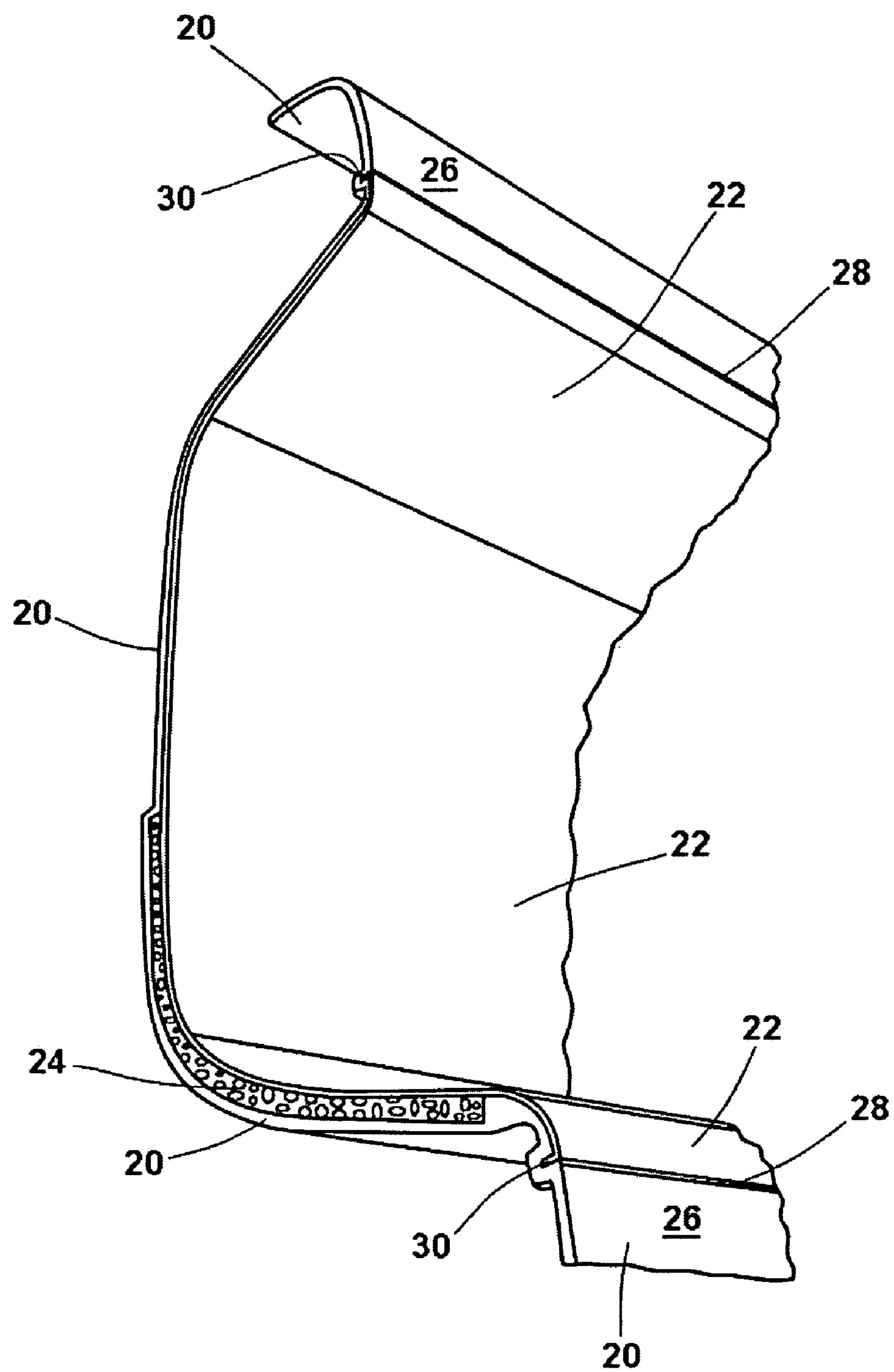
FIG. 2 is a perspective sectional view of a door trim panel in FIG. 1 taken along line 2-2.
Figure 3:
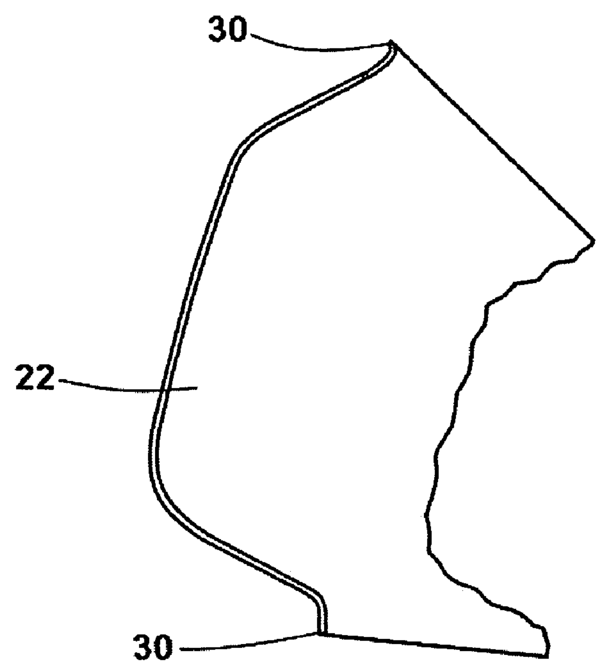
FIGS. 3-6 are fragmentary perspective views of the door trim panel of FIG. 2 in various states of fabrication.
Figure 4:
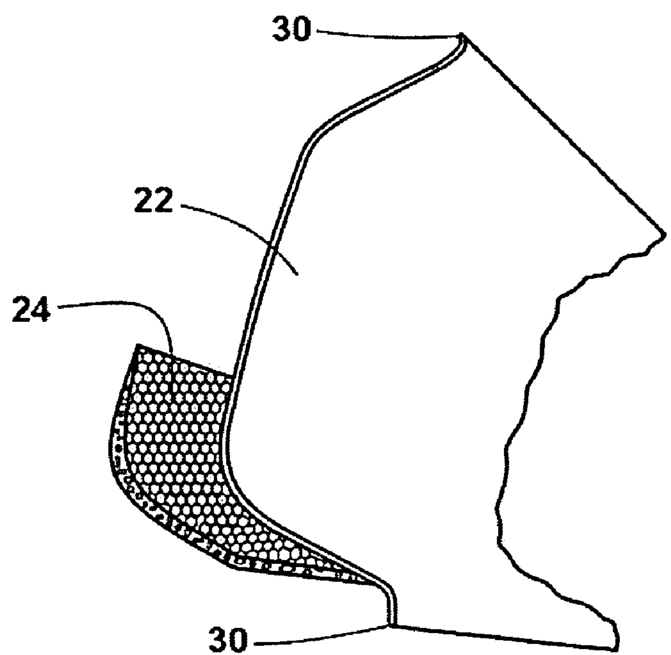

FIGS. 1 and 2 illustrate one exemplary embodiment of a component or assembly such as a panel or other structure for use in a vehicle (e.g., automobiles such as cars, trucks, buses, and the like; airplanes, boats, etc.). Such components may be provided in a wide variety of sizes, shapes, and configurations according to various exemplary embodiments. For example, such components may be utilized in an interior passenger compartment of a vehicle, and may find utility in the form of door panels, dashboards, instrument panels, consoles, sidewall trim, overhead liners, or other vehicle components or portions thereof. FIG. 1 shows one exemplary embodiment of a door panel 10.

The vehicle component is provided with one or more localized or discrete areas or portion 12 of softness or cushioning in areas that are interfaced by a passenger or other individual. For example, door panel 10 such as that shown in FIG. 1 may be provided with cushioning in areas 12 where a portion of a passenger's body are likely to contact the door (e.g., on an armrest 14, adjacent a window 16 sill, etc.) without the need to provide cushioning in the entire door (e.g., see FIG. 1 in which regions 18 of hard plastic are shown in areas not typically contacted by a passenger). In this manner, the areas 12 of cushioning may be optimized based on the typical passenger experience. One advantageous feature of such method is that materials and manufacturing costs may be reduced, and the relatively inefficient practice of providing cushioning in areas that are not generally contacted by a passenger (e.g., beneath the armrest 14, etc.) may be eliminated.

The methods of providing localized regions 12 of softness or cushioning in a manner described herein may be utilized to provide components having a wide variety of configurations. For example, the door panel 10 may be provided that includes one or more portion 18 (e.g., areas, regions, etc.) islands of hard plastic (e.g., bezels, accents, appliques, pull cups, etc.). In another example, complex geometries (e.g., ball armrests, x, y, z boundaries, etc.) may be formed. In yet another example, the door panel 10 may include proud (e.g., raised) or recessed regions of cushioning for enhanced aesthetics.

According to an exemplary embodiment, the component includes a member or element in the form of a relatively rigid substrate, base, or stratum (referred to herein as a "substrate" 20 for simplicity). A cushioned or padded portion or region 12 is located adjacent or proximate to at least a portion of the substrate 20, and includes a skin 22 and a filler material 24 provided intermediate or between the skin 22 and the substrate 20. It should be noted that according to various exemplary embodiments, all or a part of the substrate 20 may have a cushioned or padded portion 12 provided adjacent thereto. For example, according to an exemplary embodiment, the skin 22 is applied adjacent the substrate 20, and portions of the skin 22 may be in direct contact with the substrate 20, while other portions of the skin 22 may be separated from the substrate by the filler material 24. In this manner, selectively varying amounts or degrees of softness or cushioning are provided at one or more localized regions while retaining the look and feel of the skin even in those regions not provided with the additional cushioning of the filler material 24.

According to an exemplary embodiment, the relatively cushioned or padded member or element or portion 12 is disposed above or over at least a portion of the substrate 20. The skin 22 forms at least a portion of the exterior surface (e.g., the portion visible from a passenger compartment, which is typically be referred to as the "A" surface, etc.) of the component. According to an exemplary embodiment, a portion 26 of the substrate 20 forms a portion of the exterior surface. A boundary 28 between the substrate and the skin may be provided (e.g., in the form of a seam, interface or joint). Such boundary 28 may be visible at the exterior surface or may be filled in with a material to provide a "seamless" look for the component.

According to an exemplary embodiment, the skin 22 is made of a relatively soft or flexible material comprising a polymeric material (e.g., a thermoplastic olefin (TPO), polyurethane, polyvinylchloride (PVC), etc.). According to other exemplary embodiments, the skin 22 may be made of other materials, including textiles such as cloth, leather, composite materials, layered materials (e.g., a layer of leather applied above a polymeric material layer), etc.

According to a preferred embodiment, the skin 22 is provided on the substrate 22 in such a manner that the filler material 24 (if any) is located intermediate or between at least a portion of the skin 22 and the substrate 20. According to an exemplary embodiment, portions of the skin 22 may be provided in direct contact with the substrate 20, such that filler material(s) 24 are located between the skin 22 and the substrate 20 in one or more particular regions. The particular design chosen may depend on any of a variety of factors, including the desired look and feel of the outer surface of the panel, materials costs, ease of manufacturing, etc.

According to exemplary embodiments, the skin 22 may be manufactured or produced utilizing any of a variety of process. According to a preferred embodiment, the skin 22 (e.g., a TPO sheet) is thermo formed (e.g., vacuum formed, pressure formed, etc.) and then trimmed to a desired shape or configuration. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls. The formed sheet may also be trimmed for desired size.

According to an alternative embodiment, the skin is formed by a slush molding process (e.g., thermoplastic material in a liquid or powdered form is introduced into a temperature-controlled mold to form a viscous skin adjacent to the mold walls; once the skin is formed, the excess material is removed from the mold and the skin is allowed to cure and cool, after which the skin is removed from the mold). According to other alternative embodiments, the skin 22 may be manufactured according to various other methods. For example, the skin may be formed in an injection molding process, an extrusion process, a casting process (e.g., gravity casting), or any other suitable process for forming a polymeric skin.

According to an exemplary embodiment in which the skin 22 is made of a polymeric- material, the skin has a thickness of between approximately 0.1 and 2.0 millimeters, and most preferably between approximately 0.8 and 1.0 millimeters.

The skin 22 may have a size, shape, and configuration that is adapted or configured to features included in the substrate 20. The size, shape, and configuration of the skin 22 and substrate 20 may have any number of forms, and relatively complex geometries may be formed.

A material (e.g., the filler material 24) is coupled (e.g., bonded, fused, adhered, fastened, attached, etc.) to the skin 22 and located in between the skin 22 and the substrate 24 to act as a filler. It is intended that such material acts as a relatively soft or cushioning material to provide the cushioned member with at least a portion of its relatively soft or cushioned characteristic. According to a preferred embodiment, the material is a polymeric material such as a foam material (e.g., a urethane foam closed cell foam, on open celled foam, etc.).

The substrate 20 may be made of any suitable material, including any of a variety of polymers (e.g., polypropylene, polyethylene, copolymers, etc.). The substrate 20 may be formed in any of a wide variety of shapes, sizes, and configurations (see, e.g., FIG. 1, which shows the door panel 10 according to an exemplary embodiment having regions of localized cushioning), and may include a variety of other features (e.g., apertures for door locks and handles, molded-in designs, etc.). The substrate 20 may be a stand-alone component or may be a component in a larger assembly (e.g., the substrate may be an entire door panel or may be a portion thereof, etc.).

Figure 5:
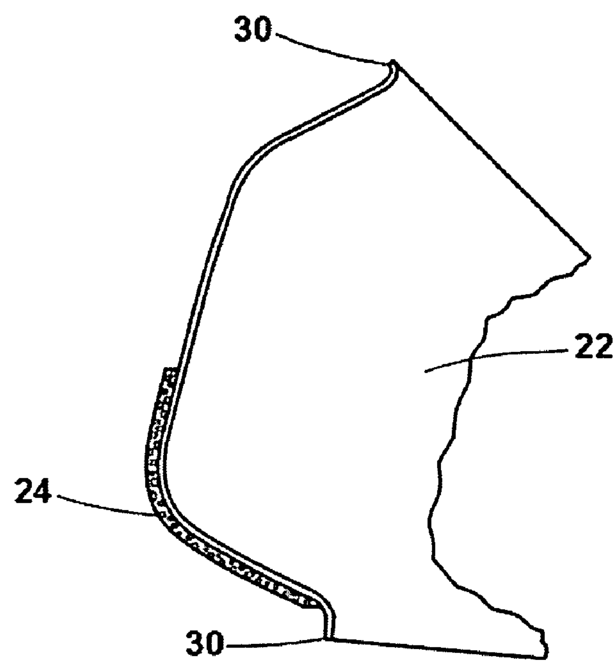
Figure 6:
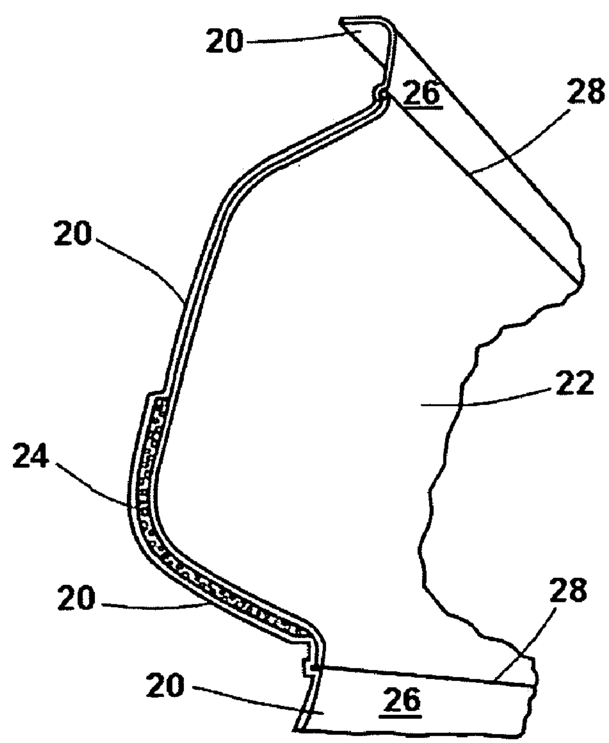

As shown in FIG. 1, a visual boundary (e.g., a seam or joint) is formed or provided between the skin 22 and the substrate 20, such that the substrate 20 forms a frame around the skin 22. The size, shape, and configuration of the boundary may vary in various exemplary embodiments. The boundary may also be eliminated or reduced in size using a material to at least partially fill in the boundary (e.g., a caulk, adhesive, liquid polymer, or other materials). According to other embodiments, the skin 22 and substrate 20 may be provided in such a manner to minimize the visual boundary. FIG. 5 illustrate one exemplary embodiment showing the coupling between the skin and the substrate.

Any of a variety of configurations may be utilized for the interface of the edges of the skin and the substrate. According to an exemplary embodiment, a flange 30 is formed on the skin 22 by forming the vacuum mold (e.g., to provide an edge of the skin with a "folded back" configuration to form a protrusion). The substrate 20 is then molded around the flanges 30 of the skin 22. According to a preferred embodiment, the skin 22 and substrate 20 are coupled together such that a relatively airtight and/or watertight seal is provided. In one example, the skin includes flanges 30 that extends substantially entirely about the periphery of the skin 22 and the substrate 20 is molded around the flanges 30 (e.g., to form a channel or groove that extends substantially entirely about the periphery of the area over which the skin 22 is provided and receive the flanges 30). Various sizes, shapes, and configurations may be used for the protrusion or flanges and the opening or groove to couple the skin 22 to the substrate 20.

According to an exemplary embodiment a door is shown with an integrated bolster and armrest. This invention utilizes a die-cut, compressible filler material 24, such as a die-cut closed cell foam attached (via pressure sensitive adhesives or like processes) to the vac-form skin 22. The part is then placed into a tool and plastic is molded around the assembly to form the substrate 20. Where the compressible filler material 24 (and the skin 22) is present, there is a soft compressible feel to the part. Where there is no compressible filler material 24 behind the skin 22, there is a harder feel to the part. Using this innovative process, door trim panels may be manufactured having multiple colors or textures or softness portions.

It is also important to note that the construction and arrangement of the elements of the vehicle trim panel as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A component for a vehicle interior comprising:

a flexible skin having a flange that extends substantially entirely about the periphery of the skin;

a compressible material coupled to the skin;

a rigid substrate having grooves that define an area;

wherein the flange of the skin is coupled to and embedded in the grooves of the substrate which provides a visual boundary between the skin and the substrate defined by the groove and extends substantially entirely about the periphery of the area over which the skin is provided;

wherein the area over which the skin is provided comprises a first soft region and a second soft region, the first soft region and the second soft region each defining an exposed surface of the component that is configured to be interfaced by a vehicle occupant;

wherein the compressible material is located between the skin and the substrate to provide the first soft region;

wherein a portion of the skin is in direct contact with the substrate to provide the second soft region; and wherein the skin extends continuously between the first soft region and the second soft region.

2. The component of claim 1 wherein the flange comprises a folded back configuration that forms a protrusion.

3. The component of claim 2 wherein the substrate comprises a molded polymer material.

4. The component of claim 3 wherein the skin is a vacuum formed and trimmed sheet of a thermoplastic olefin material.

5. The component of claim 4 wherein the compressible material is a foam material.

6. The component of claim 5 wherein the foam material is a closed cell foam.

7. The component of claim 5 wherein the foam is bonded to the skin.

8. The component of claim 1 wherein the component is a vehicle door trim panel.

9. The component of claim 1 wherein the boundary is filled in to provide the appearance of a seamless transition between the skin and the substrate.

* * * * *